United States Patent [19]
Shimoda et al.

[11] Patent Number: 5,964,334
[45] Date of Patent: Oct. 12, 1999

[54] WET FRICTION CONTACT DEVICE

[75] Inventors: Koji Shimoda, Toyota; Teikou Oobucht, Kyoto; Yoshitaka Tomiyama, Kyoto; Satoru Nakano, Kyoto, all of Japan

[73] Assignees: Toyota Jidosha Kabushiki Kaisha, Toyota, Japan; Japan Powder Metallurgy Co., Ltd., Chiyoda-ku, Japan

[21] Appl. No.: 08/906,610

[22] Filed: Aug. 5, 1997

[30] Foreign Application Priority Data

| | | | |
|---|---|---|---|
| Aug. 6, 1996 | [JP] | Japan | 8-207468 |
| Jul. 18, 1997 | [JP] | Japan | 9-194279 |

[51] Int. Cl.$^6$ ............................................. F16D 69/02
[52] U.S. Cl. ................... 192/107 M; 192/70.12; 192/70.14; 192/113.34
[58] Field of Search ................... 192/107 M, 70.14, 192/70.12, 113.34

[56] References Cited

U.S. PATENT DOCUMENTS

| | | | |
|---|---|---|---|
| 3,731,776 | 5/1973 | Fisher | 192/107 M |
| 3,791,493 | 2/1974 | Yamaguchi et al. | 192/107 M X |
| 4,278,153 | 7/1981 | Venkatu | 192/107 M X |
| 4,280,935 | 7/1981 | Ogiwara | 192/107 M X |
| 4,523,668 | 6/1985 | Uematsu et al. | 192/107 M X |
| 5,114,769 | 5/1992 | Kani et al. | 192/107 M X |
| 5,335,765 | 8/1994 | Takakura et al. | 192/70.12 X |
| 5,712,029 | 1/1998 | Tsugawa et al. | 428/323 |

FOREIGN PATENT DOCUMENTS 59-38350 3/1984 Japan.

OTHER PUBLICATIONS

Marks' Standard Handbook for Mechanical Engineers, Ninth Edition, pp. 5–14, 1987.

*Primary Examiner*—Charles A Marmor
*Assistant Examiner*—Scott Lund
*Attorney, Agent, or Firm*—Kenyon & Kenyon

[57] ABSTRACT

A wet type friction contact device comprises a non-driving member; a driving member which drives to the non-driving member; and fluid which is intervened between the non-driving member and driving member; wherein the coefficient of dynamic friction of the contact area between the non-driving member and the driving member is not less than 0.2. Therefore, the present invention provides a wet type friction contact device which secures a large amount of torque capacity compared with that of the conventional wet type contact device without bringing about large-size unit thereof and also without requiring disassembly and exchange thereof.

2 Claims, 3 Drawing Sheets

WET FRICTION CONTACT DEVICE

BACKGROUND OF THE INVENTION

1. Field of the Invention

The present invention relates to a wet type friction contact device which may be applied to a clutch and a brake of a vehicle and an industrial machine.

2. Description of the Related Art

As an example of a wet type friction contact device, in a wet type clutch which is used in an automatic transmission of a vehicle: a plurality of flywheels as driving members are connected to a crankshaft of an engine; and a plurality of clutch plates are faced movably to these flywheels. A friction member (clutch facing) as a non-driving member is stuck on each of clutch plates; and clutch plate is constructed so as to be pressed to the flywheel side by a pressure plate. Also, lubricating oil as fluid intervenes between the flywheel and the clutch plate. In this wet type clutch, by the friction force of the contact surface between the friction member (non-riving member) and the flywheel (driving member) as the mating member, the driving force of the flywheel is transmitted to the torque converter side.

On the other hand, as an example of a dry type friction contact device, in a disc brake which is used in a vehicle: a disc as a driving member is rotated integrally with wheels; and a pad is faced movably to this disc. A friction member (brake lining) is stuck on this pad, and the pad is constructed so as to be pressed to the disc side by a caliper and so on. In this disc brake, braking of the disc is conducted by friction force of the contact surface between friction member (non-driving member) and the disc (driving member) as the mating member. In the same way as that in the above, also in a drum brake, braking of a drum is conducted by friction force of the contact surface between the drum and and the friction member (brake lining) which is stuck on the shoe. Also, in a general dry type clutch, a flywheel as a driving member is connected to a crank shaft of an engine, and a clutch plate is faced movably to this flywheel. On this clutch plated, a friction member (clutch facing) is stuck as a non-driving member, and the clutch plate is constructed so as to be pressed to the flywheel side by a pressure plate. In this dry type clutch, a driving force of the flywheel is transmitted by the friction force of the contact surface between the friction member (non-driving member) and the flywheel (driving member) as the mating member.

Figure 2:
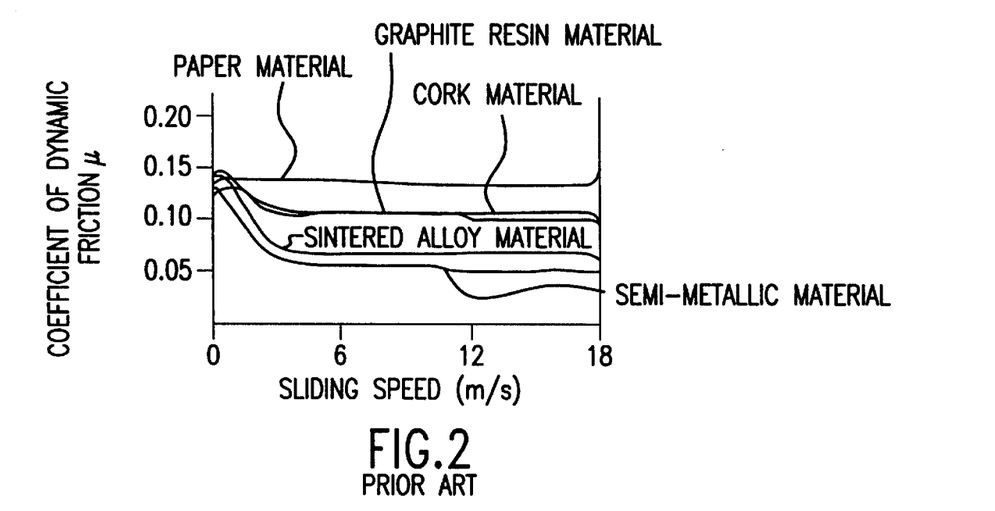
FIG. 2 is a graph showing the relationship between the sliding speed and the coefficient of dynamic friction of the conventional friction member.

The conventional wet type friction contact device is superior in wear resistance and almost does not need the exchange thereof by the cooling effect of the fluid of lubricating oil, but the conventional wet type friction contact device has the following disadvantages. As shown in FIG. 2, the coefficient of dynamic friction $\mu$ of the paper material to steel as the mating member is 0.14, which is the highest coefficent of dynamic friction as compared with those of the existing material such as a graphite resin material, cork material, sintered alloy material and semi-metallic material. So the coefficient of dynamic friction $\mu$ of those existing material to steel as the mating member ranges from 0.05 to 0.14 and it is relatively low. This is because contact ratio between solid bodies is reduced owing to intervening of lubricating oil as fluid at each of contact surfaces between friction member as non-driving member and the driving member thereof as the mating member. Accordingly, in order to secure a large amount of torque capacity, as the conventional wet type friction contact device, it is necessary to multiply driving member and non-driving member and enlarge diameter thereof so that the unit thereof is necessary to be large-sized. For example, in the case of the wet type clutch, the fact is that multi-disc of flywheel and so as mentioned above brings about the large-sized clutch unit. Accordingly, in an automatic transmission and a differential limiting-device of a passenger car, the above-mentioned disadvantages cause a large amount of difficulty in realizing high performance, small size and lightness in weight.

On the other hand, in the case of the conventional dry type friction contact device whose contact ratio between solid bodies is relatively large, the coefficient of dynamic friction u of the friction member to steel as the mating member ranges from 0.3 to 0.5 and amounts are relatively high level. Accordingly, it is possible to secure relatively a large amount of torque capacity, however, there is no effect of cooling by the fluid of lubricating oil and so on. Therefore, the conventional device has the following disadvantages: wear resistance is inferior caused by temperature rise on each of contact surfaces; and disassembly and exchange of the friction member is necessary.

SUMMARY OF THE INVENTION

The present invention has been developed in view of the conventional circumstances described above. It is therefore an object of the present invention to provide a wet type friction contact device which secures a large amount of torque capacity compared with that of the conventional wet type contact device without bringing about large-sized unit thereof and also without requiring disassembly and exchange thereof.

In order to solve the above-mentioned problems, the present inventors have earnestly studied as follows: the present inventors dismissed a technical idea that friction force within the range shown in the conventional wet type friction contact device is utilized in order to conduct the conventional transmission and control of driving force; however in the wet type friction contact device, the present inventors have earnestly studied under an technical idea that the above-mentioned objects may be obtained, if the contact ratio between solid bodies is brought near to the contact ratio in the case of dry type and if adhesion and digging up are generated between the non-driving member and driving member. Furthermore, if these contact surfaces are cleaned, and if oxidation and work hardening are not conducted on these contact surfaces, the present inventors supposed that adhesion and digging up are expected to be generated on these contact surfaces easily so that the present inventors have continued the research. Based on these researches the wet type friction contact device described in claims 1 to 3 was obtained.

A wet type friction contact device of claim 1 comprises: a non-driving member; a driving member which drives to the non-driving member; and fluid which is intervened between the non-driving member and driving member; wherein the coefficient of dynamic friction of the contact area between the non-driving member and the driving member is not less than 0.2.

As fluid, lubricating oil or water can be adopted.

In the wet type friction contact device of claim 1, the coefficient of dynamic fiction of the contact area between the non-driving member and the driving member is not less than 0.2 which is the usual level in a dry type friction contact device so that without causing the unit to be large sized, it can be possible to secure a larger amount of torque capacity compared with that of the conventional wet type friction contact device. Also, in the wet type friction contact device according to claim 1, the temperature rise at the contact surface can be restrained by the effect of cooling of fluid, wear resistance is superior and also, disassembly and exchange thereof is not needed.

Accordingly, if the wet type friction contact device of claim 1 is adopted in an automatic transmission or a differential limiting-device of a passenger car, it can realize high performance, small size and lightness in weight.

A wet type friction contact device of claim 2 according to claim 1, wherein the contact surface of one member of the non-driving member and the driving member comprises at least one major element; and the contact surface of the other member thereof comprises a mixture or an alloy of at least one major element and at least one kind of minor elements having a value of free energy which is smaller than that of at least one major element.

The major element(s) and the minor element(s) may be selected based on the value of free energy. That is, an inclination of a material to react with oxygen can be quantified by actually measuring energy which is required to oxidizing reaction. This kind of reaction can be expressed as follows:

material+oxygen+energy→oxide

Also in the wet type, there exist oxygen in air melted in oil, in air in babbles or in air included in a porous material so that the reaction of oxygen is considered to be generated as in the same way as that in the dry type on the surface thereof where temperature reaches to be high grade as in the case of friction phenomena. When energy is positive, the material is stable. Therefore, when energy is negative, the material is oxidized. The following Table 1 shows generating energy of oxides per oxygen 1 mol in 273K, which are known in industrial materials.

TABLE 1

| MATERIAL | OXIDE | ENERGY (/kJ) |
|---|---|---|
| BERYLLIUM | BeO | −1182 |
| MAGNESIUM | MgO | −1162 |
| ALUMINUM | $Al_2O_3$ | −1045 |
| ZIRCONIUM | $ZrO_2$ | −1028 |
| URANIUM | $U_2O_5$ | −1000 |
| TITANIUM | TiO | −848 |
| SILICON | $SiO_2$ | −836 |
| TANTALUM | $Ta_2O_5$ | −764 |
| NIOBIUM | $Nb_2O_3$ | −757 |
| CHROMIUM | $Cr_2O_3$ | −701 |
| ZINC | ZnO | −636 |
| SILICON NITRIDE | $3SiO_2 + 2N_2$ | −629 |
| SILICON CARBIDE | $SiO_2 + CO_2$ | −580 |
| MOLYBDENUM | $MoO_2$ | −534 |
| TUNGSTEN | $WO_2$ | −510 |
| IRON | $Fe_3O_4$ | −508 |
| TIN | SnO | −500 |
| NICKEL | NiO | −439 |
| COBALT | CoO | −422 |
| WOOD, A LOT OF POLYMERS, CFRP | | −400 |
| DIAMOND, GRAPHITE | $CO_2$ | −389 |
| WC CERMET | $WO_2 + CO_2$ | −349 |
| LEAD | $Pb_3O_4$ | −309 |
| COPPER | CuO | −254 |
| GFRP | | −200 |
| PLATINUM | $PtO_2$ | −160 |
| SILVER | $Ag_2O$ | −5 |
| FLUORINE CONTAINED RESIN | | 0 |
| GOLD | $Au_2O_3$ | +80 |
| ALKALI HALIDE (NaCl and so on) | | +400~+1400 |

TABLE 1-continued

| MATERIAL | OXIDE | ENERGY (/kJ) |
|---|---|---|
| MAGNESIA (MgO), SILICA ($SiO_2$) ALUMINA ($Al_2O_3$) BERYLLIA (BeO) | OXIDE OF HIGHER ORDER | POSITIVE VALUE |

The value of free energy shows the direction of the reaction. That is, if the material has less a value of free energy, the material is more easy to be oxidized. If there exist the material which is easy to be oxidized, other materials are suppressed to be oxidized. And the material without the oxidation film is supposed to easily generate an intermolecular bond or interatomic bond of itself. Therefore, major element(s) and minor element(s) are variably selected from materials shown in Table 1, considering with respect to large and small value of generating energy of oxides. For example, if copper (Cu) is adopted as a major element and zinc (Zn) whose value of free energy (generating energy of oxide) is smaller than that of Cu is adopted, Zn is easy to be oxidized and Cu is suppressed to be oxidized so that Cu which hardly generates an oxidation film easily generates the intermolecular or interatomic bond of itself and it is considered that the above-mentioned phenomena reaches to adhesion. It is thought that this adhesion contributes to improve the coefficient of dynamic friction.

Accordingly, in the wet type friction contact device of claim 2, the contact surface of the other member comprises the major element(s) and the minor element(s) and the value of free energy of the minor element(s) is smaller than that of the major element(s) so that the oxidation of the major element(s) is suppressed. Then, the major element(s) of one member get in contact with the major element(s) without oxide film of the other member so that the major elements are adhered each other and then, the coefficient of dynamic friction is greatly improved.

If the contact surface of the other member is a mixture or an alloy of the major element(s) and minor element(s), the good effect of suppressing oxidation of the major element(s) is obtained and it is suggested that the adhesion is generated easily in the case of contact so that the effect of improving the coefficient of dynamic friction is increased. When an alloy is adopted, it is preferable that hardening change on the surface thereof before and after sliding, in which frictional force between one member and the other member is obtained, is about 0 +30%. This is because adhesion inhibition caused by work hardening is suppressed easily if hardening change falls in the above-mentioned range.

Then, the other component elements may be selected from the component elements of claim 1. The wet type friction contact device of claim 2 can produce the same effect as that of claim 1. The present wet type friction contact device can embody devices, which can be used only once, such as a press-in member, an antislipping member and a device which positively lock (seize) the driving member and the non-driving member. Especially, when it is applied to the press-in member, it can be adopted if it endures stress even under the generally unfavorable condition in which oil level remains so that the practical value thereof is appreciated.

A wet type friction contact device of claim 3 according to claim 1, wherein at least one of the non-driving member and driving member is a porous material; a contact surface of one member includes a hard material having not less than Hv150; and a contact surface of the other member comprises a mixture or an alloy of at least one major element and at least one kind of minor elements having a value of free energy which is smaller than that of at least one major element.

As a porous material, a sintered body of metallic particles can be adopted. As the above-mentioned metallic particles, the major element(s) or the minor element(s) can be adopted.

It is unnecessary to add any limitation if a hard material has not less than Hv 150, but it is preferable that the hard material has from Hv 150 to 4000.

It is more preferable that a hard material has from Hv 170 to 3500 because the coefficient of friction is relatively high and the wear rate is low, particularly the hard material has from Hv 170 to 2000.

As a hard material, particulate materials or fibrous materials such as $SiO_2$, $Al_2O_3$, $Al_2O_3$ $SiO_2$ and $CaF_2$ can be adopted.

The contact surface of one member can include the major component(s) from the beginning.

The major element(s) are not completely prevented from being oxidized by a long period of use even if the oxidation thereof is suppressed by the minor element(s). In view of the above-mentioned point, the wet type friction contact device of claim 3 is effective.

That is, in the wet type friction contact device of claim 3, almost all of pressing load of the non-driving member and the driving member is received by the hard material of one member so that one member breaks through a fluid film between each of contact surfaces of non-driving member and the driving member and it bites into the other member so that digging up is supposed to be conducted. At this time, resistance force against digging up may be generated and the contact area may be increased so that the coefficient of dynamic friction is improved.

Furthermore, in the wet type friction contact device of claim 3, the hard material of one member digs up the major element(s) of the other member, so that the major element(s) of the other member lose the oxidation film. The above-mentioned phenomena is supposed to be promoted by braking through the fluid film of each of contact surfaces by the hard material of one member and braking through the fluid surface by a projection portion of abrasion powders themselves which dug up the other member. And, at least one of non-driving member and driving member is a porous material so that the major element(s) of the mating side stick to the inside of pores of a porous material as abrasion powders. That is, if one member is a porous material, major element(s) of the other member stick to one member. Also, if both of one member and the other member are porous materials, the major element(s) of the other member stick to one member and the major element(s) which adhere to one member stick to the other member. Furthermore, only the other member is a porous material, by including the major element(s) in the contact surface of one member in advance, the major element(s) of one member stick to the other member. Therefore, after using for a long period of time, the major element(s) of one member get in contact with the major element(s), which include no oxidation film, of the other member, so that major elements are supposed to adhere each other and this leads to stabilize and improve the coefficient of dynamic friction.

Then, the components described in claims 1 and 2 can be used as other components of claim 3. And, the wet type friction contact device of claim 3 can produce the same effect as that of claim 1. The present wet type friction contact device can embody devices, which can be used repeatedly, such as a clutch and brake under the existence of fluid.

BRIEF DESCRIPTION OF THE DRAWINGS

A more complete appreciation of the present invention and many of its advantages will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiments which are provided herein for purposes of illustration only and are not intended to limit the scope of the appended claims.

First Preferred Mode

In the First Preferred Mode, the inventions of claims 1 and 3 are embodied and Preferred Embodiments 1 to 14 and Comparative Examples 1 to 10, which can be applied to the wet type clutch are explained as follows.

Figure 3:
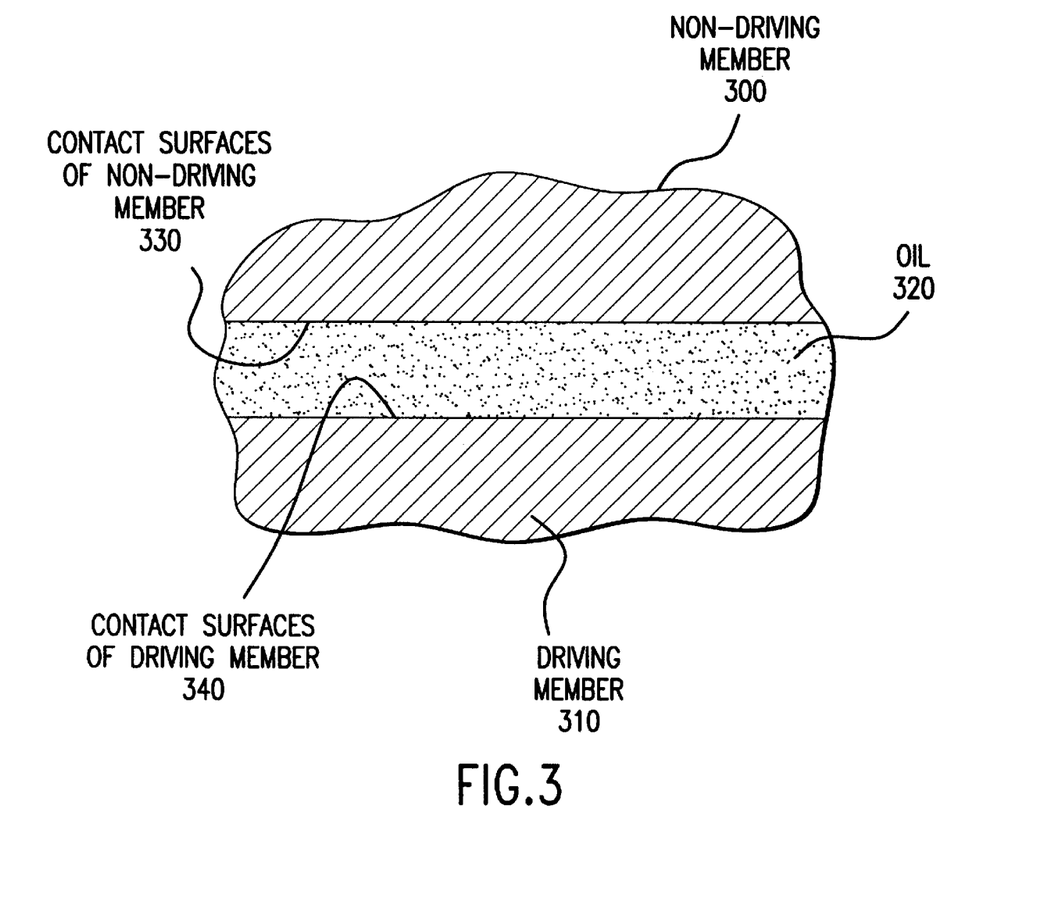
FIG. 3 is an example of a wet friction contact device according to the present invention.

FIG. 3 shows a wet contact device according to the present invention. The device includes non-driving member (300), a driving member (310) which drives the non-driving member (300), and oil (320) which is intervened between non-driving member (300) and driving member (310). Also included is a contact surface (330) for the non-driving member (300) and a contact surface (340) of the driving member (310).

TABLE 2

| | FRICTION MEMBER (NON-DRIVING MEMBER) | | | | |
|---|---|---|---|---|---|
| | MATRIX | POROSITY (vol %) | KIND | HARD MATERIAL HARDNESS (Hv) | AMOUNT OF ADDITION (vol %) |
| EMBODI-MENTS | | | | | |
| 1 | Al ALLOY | 20 | $SiO_2$-P | 1300 | 10 |
| 2 | Al ALLOY | 20 | $Al_2O_3.SiO_2$—F | 730 | 10 |
| 3 | Cu ALLOY | 20 | $SiO_2$—P | 1300 | 10 |

TABLE 2-continued

FRICTION MEMBER (NON-DRIVING MEMBER)

| | MATRIX | POROSITY (vol %) | KIND | HARD MATERIAL HARDNESS (Hv) | AMOUNT OF ADDITION (vol %) |
|---|---|---|---|---|---|
| 4 | Al ALLOY | 20 | $SiO_2$—P | 1300 | 30 |
| 5 | Al ALLOY | 20 | $CaF_2$—P | 170 | 20 |
| 6 | Al ALLOY | 20 | $CaF_2$—P | 170 | 20 |
| 7 | Al ALLOY | 20 | $CaF_2$—P | 170 | 20 |
| 8 | Al ALLOY | 20 | $CaF_2$—P | 170 | 20 |
| 9 | Al ALLOY | 20 | $CaF_{2-P}$ | 170 | 20 |
| 10 | Al ALLOY | 20 | $SiO_2$—P | 1300 | 10 |
| 11 | Al ALLOY | 20 | $SiO_{2-P}$ | 1300 | 5 |
| 12 | Al ALLOY | 20 | $Al_2O_3$—P | 2000 | 10 |
| 13 | Al ALLOY | 20 | $Si_3N_4$—P | 3300 | 10 |
| 14 | Al ALLOY | 20 | SiC—P | 2700 | 10 |
| COMPARATIVE EXAMPLES | | | | | |
| 1 | | | PAPER MATERIAL | | |
| 2 | Al ALLOY | 20 | $SiO_{2-P}$ | 1300 | 10 |
| 3 | Al ALLOY | 20 | none | — | 0 |
| 4 | Al ALLOY | 5 | $SiO_{2-P}$ | 1300 | 10 |
| 5 | Al ALLOY | 20 | $SiO_{2-P}$ | 1300 | 10 |
| 6 | Al ALLOY | 20 | $SiO_2$—P | 1300 | 10 |
| 7 | Al ALLOY | 20 | $SiO_{2-P}$ | 1300 | 10 |
| 8 | Al ALLOY | 20 | $SiO_{2-P}$ | 1300 | 10 |
| 9 | Al ALLOY | 20 | $SiO_{2-P}$ | 1300 | 10 |
| 10 | Al ALLOY | 20 | $SiO_{2-P}$ | 1300 | 10 |

At first, powders of an Al alloy and powders of a Cu alloy were prepared so as to construct a matrix. Here, the Al alloy is Al—1Si—0.5Cu—1Mg and Cu alloy is Cu—10Ni.

As a hard material, $SiO_2$-P, $Al_2O_3$ $SiO_2$-F, $Al_2O_3$-P, $CaF_2$-P, $Si_3N_4$-P and SiC-P were prepared. Here, $SiO_2$-P is powders of $SiO_2$ whose mean particle diameter ranges from 50 to 100 μm; $Al_2O_3$ $SiO_2$-F is fibers of $Al_2O_3$ $SiO_2$ whose average length ranges from 10 to 50 μm; $Al_2O_3$-P is powders of $Al_2O_3$ whose mean particle diameter ranges from 50 to 100 μm; $CaF_2$-P is powders of $CaF_2$ whose mean particle diameter ranges from 50 to 150 μm; $Si_3N_4$-P is powders of $Si_3N_4$ whose mean particle diameter ranges from 30 to 70 μm; and SiC-P is powders of SiC whose mean particle diameter ranges from 30 to 50 μm.

Materials were used in rates shown in Table 2; these materials were filled inside of a metal mold on which metal mold lubricating components such as wax and metallic soap were painted; and by molding under the pressure of 200 MPa, molded products were obtained. To all molded products, artificial graphite particles (mean particle diameter ranges from 20 to 100 μm) as well as hard materials were added. After these molded products were heated in the atmosphere of nitrogen and at the temperature ranging from 300 to 500° C. and metal mold lubricating components were removed, they were sintered by heating for about one hour at the temperature ranging from 500 to 650° C. so that each of friction members (excluding the comparative example 1) as non-driving member were produced. However, a sintered material in which powders of Cu alloy were used as a matrix was sintered at the temperature ranging from 950 to 1000° C. Each of porosity (%) is also shown in Table 2. The porosity was obtained by oil impregnating.

TABLE 3

MATING MEMBER (DRIVING MEMBER) FRICTION CONTACT CHARACTERISTICS

| | KIND | INITIAL HARDNESS (Hv) | RATE-OF CHANGE OF HARDNESS AFTER SLIDING (%) | COEFFICIENT OF DYNAMIC FRICTION (u) | WEAR RATE ($mm^3/J$) |
|---|---|---|---|---|---|
| EMBODIMENTS | | | | | |
| 1 | Cu—10Zn | 54 | +15 | 0.30 | $5 \times 10^{-4}$ |
| 2 | Cu—10Zn | 54 | +18 | 0.30 | $5 \times 10^{-4}$ |
| 3 | Cu—10Zn | 54 | +20 | 0.30 | $4 \times 10^{-4}$ |
| 4 | Cu—10Zn | 54 | +25 | 0.32 | $6 \times 10^{-4}$ |
| 5 | Cu—10Zn | 54 | +15 | 0.25 | $5 \times 10^{-4}$ |
| 6 | Cu—5Zn | 43 | +20 | 0.24 | $3 \times 10^{-4}$ |
| 7 | Cu—25Zn | 110 | +5 | 0.24 | $6 \times 10^{-4}$ |
| 8 | AC4 | 70 | +28 | 0.22 | $5 \times 10^{-4}$ |

TABLE 3-continued

MATING MEMBER (DRIVING MEMBER) FRICTION CONTACT CHARACTERISTICS

| | KIND | INITIAL HARDNESS (Hv) | RATE-OF CHANGE OF HARDNESS AFTER SLIDING (%) | COEFFICIENT OF DYNAMIC FRICTION (u) | WEAR RATE ($mm^3$/J) |
|---|---|---|---|---|---|
| 9 | A390 | 110 | +20 | 0.22 | $4 \times 10^{-4}$ |
| 10 | Cu—10Sn—2Zn | 78 | +22 | 0.22 | $4 \times 10^{-4}$ |
| 11 | Cu—10Zn | 54 | +15 | 0.22 | $4 \times 10^{-4}$ |
| 12 | Cu—10Zn | 54 | +35 | 0.20 | $8 \times 10^{-4}$ |
| 13 | Cu—10Zn | 54 | +35 | 0.24 | $4 \times 10^{-4}$ |
| 14 | Cu—10Zn | 54 | +35 | 0.25 | $8 \times 10^{-4}$ |
| COMPARATIVE EXAMPLES | | | | | |
| 1 | Fe—0.35C | 230 | −10 | 0.15 | $4 \times 10^{-4}$ |
| 2 | Fe—0.35C | 230 | −10 | 0.15 | $5 \times 10^{-5}$ |
| 3 | Cu—10Zn | 54 | 0 | 0.04 | $1 \times 10^{-4}$ |
| 4 | Cu—10Zn | 54 | 0 | 0.15 | $5 \times 10^{-5}$ |
| 5 | SUS304 | 360 | +50 | 0.20 | $1 \times 10^{-3}$ |
| 6 | Cu—30Zn | 185 | −20 | 0.17 | $5 \times 10^{-5}$ |
| 7 | Cu—10Sn—2Zn | 210 | −20 | 0.17 | $5 \times 10^{-5}$ |
| 8 | Al | 35 | +5 | 0.15 | $2 \times 10^{-3}$ |
| 9 | AC3 | 70 | +5 | 0.15 | $8 \times 10^{-4}$ |
| 10 | Cu | 80 | +5 | 0.16 | $1 \times 10^{-3}$ |

On the other hand, as shown in Table 3, the mating member as the driving member was prepared. Here, AC4 is Al—7Si—0.6Mg; A390 Al—17Si—0.5Mg; SUS304 is Fe—18Cr—8Ni; and AC3 is Al—12Si. These mating members were obtained by processing metallic plate in a disc shape.

Figure 1:
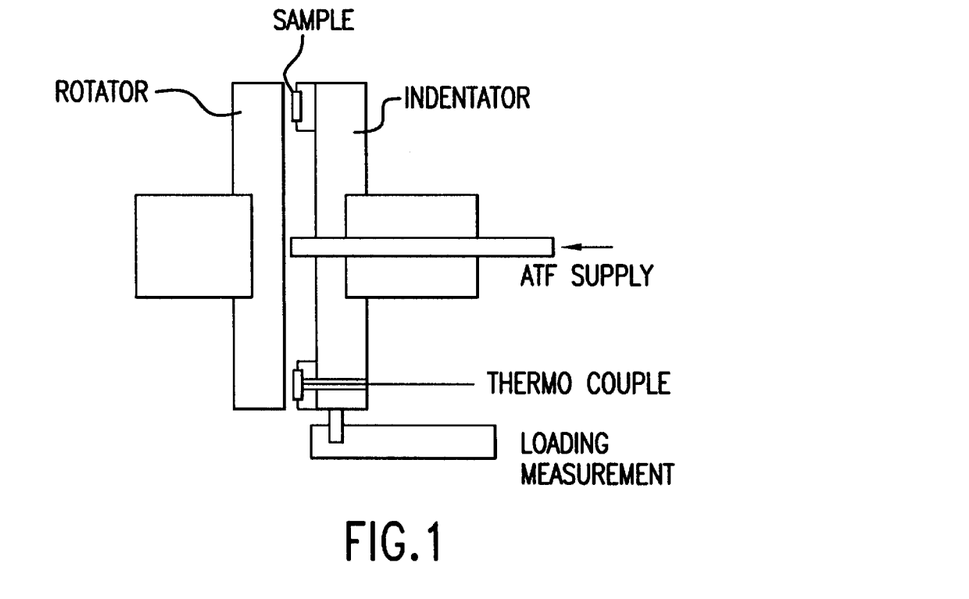
FIG. 1 is an explanatory view showing a schematic construction of a friction testing machine used in preferred embodiments.

Next, setting each of friction members as a sample, each of mating members is mounted on a friction testing machine shown in FIG. 1 as a rotator so that the coefficient of dynamic friction $\mu$ and the wear rate ($mm^3$/J) are measured.

The conditions at this time are shown in the following Table 4.

TABLE 4

| | |
|---|---|
| SAMPLE DIMENSION | φ11.3 × 1.5 mm (TWO PIECES) |
| SLIDING SPEED | 1 m/SECOND |
| SLIDING TIME | FOR ONE MINUTE |
| REPEATING NUMBER | 30 TIMES |
| LUBRICATION | STATIONARY: 120 CC/MINUTE |
| USING OIL | ATF (DEXTRON II PRODUCED BY ESSO OIL CO., LTD.) |
| PRESSING FORCE | 0.2 KN |
| DISTANCE BETWEEN SAMPLES | 100 mm |
| LOADING MEASUREMENT | STRAIN GAUGE, RECORDER |
| TEMPERATURE MEASUREMENT | THERMO COUPLE |

Here, a wear rate was obtained as follows: an abrasion loss of the friction member which was measured by a micrometer was divided by energy; an abrasion loss of the mating member which was measured by a surface roughness measuring instrument was divided by energy; and the sum of the above-mentioned divided amounts was obtained. A rate of change of hardness after sliding (%) was obtained by comparing the hardness of contact surface of the mating member before sliding (Vickers hardness: from Hv1 to 5 kg) and the hardness of contact surface after sliding. These friction characteristics were also shown in Table 3.

As shown in Table 2 and 3, in Preferred Embodiments 1 to 14, there is little difference whether an Al alloy is selected or a Cu alloy is selected as the matrix of the friction member. However, if a hard material is added and as the mating member, a Cu alloy and an Al alloy having hardness ranging from Hv40 to 110 is used, it is found that the coefficients of dynamic friction $\mu$ of the Preferred Embodiments 1 to 14 range from 0.20 to 0.32 so that they are extremely higher amounts compared with those of the Comparative Examples 1 to 10. Also, in the Preferred Embodiments 1 to 14, wear rate is the same as that of the paper material of the Comparative Example 1 or at the maximum, 1.5 times of the wear rate of the paper material of the Comparative Example 1, so that it is found that wear resistance thereof is superior.

Figure 4:
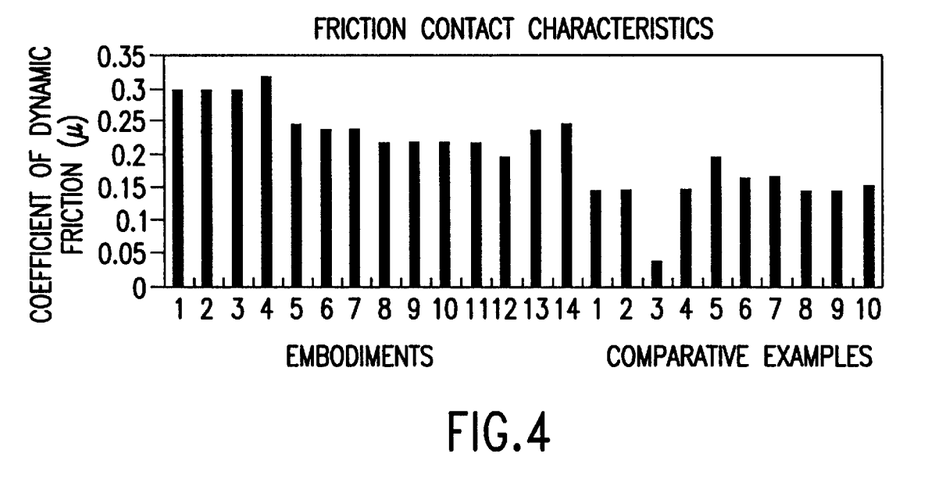
FIG. 4 is a graph of the friction contact characteristics for the embodiments and comparative examples described in the present invention.

FIG. 4 shows a graphical representation of embodiments 1–14 and comparative examples 1–10, which can be applied to the wet type clutch.

Furthermore, if the addition amount of hard material is more than 5 vol %, the coefficient of dynamic friction $\mu$ amounts to more than 0.22; however, based on the results of the Preferred Embodiments 1, 4 and 11 and the Comparative Example 3, even if the addition amount of hard material exceeds to 30 vol %, the coefficient of dynamic friction $\mu$ does not change so much and it is found that wear-out is increased. Moreover, the hardness of the mating member after sliding is increased in an amount of 35% compared to the initial hardness of the working surface as it is so that it is found that work hardening is generated here.

Furthermore, the hardness of the mating member is soft in pure Al of Hv35, however caused by low intensity, it is found that abrasion is remarkable. And the coefficients of dynamic friction $\mu$ of the Comparative Examples 1 to 10 are low compared with those of the Preferred Embodiments 1 to 14. A Cu alloy which was used in the Preferred Embodiment 10 as the mating member is JIS standard BC3 of Hv210, and this was obtained by conducting annealing of a commercial alloy plate at 830° C. for one hour. Compared with the Comparative Example 7 in which the alloy plate is used as it is, the hardness thereof is decrease to be Hv78. In a Cu alloy and an Al alloy having the hardness of the mating member of Hv40 to 110, high coefficients of dynamic friction $\mu$ are obtained. A characteristic of the Preferred Embodiments 1 to 14 resides in the fact that a rate-of-change of the hardness before and after sliding ranges from +5 to +35%. The work hardening is slightly found in the Preferred Embodiments 1 to 14, however, compared with the Comparative Example 5 in which a rate-of-change of the hardness before and after sliding is +50% and in which the work hardening is remarkably found, the work hardening of the Preferred Embodiments 1 to 14 is found less. As is found in the Comparative Examples 2, 6 and 7, there are found softening (rate-of-change is negative), though the wearout thereof is favorable, the coefficient of dynamic friction $\mu$ thereof is not satisfied.

Accordingly, the generating effect of friction in the Preferred Embodiments 1 to 14 is deeply influenced by the addition of a hard material and the mating members. The hard material breaks through oil film of the contact surface, it gets in contact with the mating member and also, oil permeates pores of the porous material so that it is assumed that the effect thereof is generated by the contact between the solids as the result of the above-mentioned phenomena. However, comparing the friction in drying condition, the contact surface is cooled by the oil film so that the wear rate is low in the Preferred Embodiments 1 to 14, so that we can expect extremely improved practicality as the wet type friction contact device which needs no change of parts.

Next, free energy of an oxide of a constitutive element of a mating member is shown in the following Table 5.

TABLE 5

|  | MAJOR ELEMENT | | MINOR ELEMENT | | OTHER ADDITIONAL ELEMENT | |
| --- | --- | --- | --- | --- | --- | --- |
|  | KIND | $\Delta$ G | KIND | $\Delta$ G | KIND | $\Delta$ G |
| EMBODIMENTS |  |  |  |  |  |  |
| 1 TO 7, 11 TO 14 | Cu | −254 | Zn | −636 | — | — |
| 8 | Al | −1045 | Mg | −1162 | Si | −836 |
| 9 | Al | −1045 | Mg | −1162 | Si | −836 |
| 10 | Cu | −254 | Sn | −500 | Zn | −636 |
| COMPARATIVE EXAMPLES |  |  |  |  |  |  |
| 2 | Fe | −508 | C | −389 | — | — |
| 5 | Fe | −508 | Cr | −701 | Ni | −439 |
| 8 | Al | −1045 | NONE | — | — | — |
| 9 | Al | −1045 | Si | −836 | — | — |
| 10 | Cu | −254 | NONE | — | — | — |

As is clear from Table 5, in the Preferred Embodiments 1 to 14, all of the absolute values of free energy of oxides of the minor elements are smaller than those of major elements. The minor element of the Preferred Embodiments is tend to be oxidized more easily comparing the major element thereof so that it is assumed that oxidation of the major element is prevented from occurring to some extent on the metallic surface. As the result, a metallic surface whose activity is high is tend to be appeared at the time of sliding, so that it is assumed the friction force thereof is increased. On the other hand, in the Comparative Examples, only the Comparative Example 5 has the same tendency as that of the Preferred Embodiments 1 to 14, however based on the above-mentioned fact, the work hardening is remarkably conducted at the time of sliding and it is not favorable. Other Comparative Examples shown in Table 5 have the opposite tendency compared with that of the Preferred Embodiments 1 to 14, it is not preferable as the combination of the major element and the minor element.

Here, the material of the mating member is not especially defined. If an Al alloy or Cu alloy is employed, the thermal conductivity thereof is high and the rise of temperature on the friction surface at the time of sliding can be decreased so that the higher coefficient of dynamic fiction stabilizes and the wear rate is about 3 to $8 \times 10^{-4}$ ($mm^3/J$) and this rate is within the range in which it is used as the friction member.

In the combination of the contact surfaces of the Preferred Embodiments 1 to 14, as shown in the above-mentioned table, the coefficients of dynamic friction u fall in the range of 0.20 to 0.32 under the condition of intervening of the fluid film so that they show extremely higher friction force. However under the condition without the fluid film, for example, sliding in the dry type, they are different from the general phenomena and as the coefficient of dynamic friction u is 0.2, the friction force thereof is decreased. In the dry type, because there is no fluid film, the oxidation on the contact surface is easy to be advanced and therefore, it is supposed to be brought about because the effect of adhesion in the present contact surface is decreased in that amount.

Second Preferred Mode

In a Second Preferred Mode, the inventions of claims 1 and 2 are embodied and the Preferred Embodiment 15 and the Comparative Example 11, which can be applied to the wet type clutch, are explained as follows.

The Preferred Embodiment 15 comprises: a friction member (non-driving member) which is only composed of the Al alloy used in the First Preferred Mode 1; a mating member (driving member) which is only composed of Cu—10Zn adopted in the above-mentioned Preferred Embodiment 1; and the used oil which is used in the First Preferred Mode.

On the other hand, the Comparative Example 11 comprises: a friction member (non-driving member) which is composed of the Al alloy used in the First Preferred Mode; a mating member (driving member) composed of pure Cu; and the used oil which is used in the First Preferred Mode.

To the Preferred Embodiment 15 and the Comparative Example 11, EPMA analysis of the surface of each of contact surfaces after a friction test was conducted. With the coefficient of dynamic friction $\mu$, the results are shown in the following Table 6. Here, o shows that the element is strongly existed on each of contact surfaces and $\Delta$ shows that the element is weekly existed on each of contact surfaces.

TABLE 6

|  | COEFFICIENT OF DYNAMIC FRICTION | CONTACT SURFACE | Al | Cu | Zn | O | C | S |
| --- | --- | --- | --- | --- | --- | --- | --- | --- |
| EMBODIMENT 15 | 0.3 | FRICTION MEMBER | o | o | o | o | $\Delta$ | $\Delta$ |
|  |  | MATING MEMBER | — | o | o | — | — | — |
| COMPARATIVE EXAMPLE 11 | 0.15 | FRICTION MEMBER | o | o | — | o | $\Delta$ | $\Delta$ |
|  |  | MATING MEMBER | — | o | — | o | — | — |

As shown in Table 6, it is found that there exists no oxygen on the surface of the contact surface of the mating member in the Preferred Embodiment 15, however, in the Comparative Example 11, there exists oxygen on the surface of the mating member. This is because Cu—10Zn used in the Preferred Embodiment 15 is hard to be oxidized.

Having now fully described the present invention, it will be apparent to one of ordinary skill in the art that many changes and modifications can be made thereto without departing from the spirit or scope of the present invention as set forth herein including the appended claims.

The entire disclosure of Japanese Patent Application No. 8-207468 filed on Aug. 6, 1996 including specification, claims, drawings and summary is incorporated here by reference in its entirety.

We claim:

1. A wet friction contact device comprising:

a non-driving member;

a driving member which drives to said non-driving member; and oil which is intervened between said non-driving member and said driving member;

wherein a coefficient of dynamic friction between said non-driving member and said driving member is not less than 0.2 and wherein a contact surface of one of said non-driving member and said driving member comprises at least one major element, and a contact surface of the other of said non-driving member and said driving member comprises a mixture or an alloy of said at least one major element and at least one kind of minor element having a value of free energy which is smaller than that of said at least one major element.

2. A wet friction contact device comprising:

a non-driving member;

a driving member which drives to said non-driving member; and oil which is intervened between said non-driving member and said driving member;

wherein a coefficient of dynamic friction between said non-driving member and said driving member is not less than 0.2 and wherein at least one of said non-driving member and said driving member is a porous material; a contact surface of one of said non-driving member and said driving member includes a hard material having not less than Hv150; and a contact surface of the other of said non-driving member and said driving member comprises a mixture or an alloy of at least one major element and at least one kind of a minor element having a value of free energy which is smaller than that of said at least one major element.

\* \* \* \* \*